United States Patent
Swartzlander et al.

(10) Patent No.: US 7,833,469 B2
(45) Date of Patent: Nov. 16, 2010

(54) PREPARATION OF YTTRIA-STABILIZED ZIRCONIA REACTION SINTERED PRODUCTS

(75) Inventors: Ruthie Swartzlander, Golden, CO (US); W. Grover Coors, Golden, CO (US)

(73) Assignee: CoorsTek, Inc., Golden, CO (US)

( * ) Notice: Subject to any disclaimer, the term of this patent is extended or adjusted under 35 U.S.C. 154(b) by 719 days.

(21) Appl. No.: 11/625,207

(22) Filed: Jan. 19, 2007

(65) Prior Publication Data

US 2007/0176332 A1    Aug. 2, 2007

Related U.S. Application Data

(63) Continuation-in-part of application No. 11/014,198, filed on Dec. 15, 2004, now Pat. No. 7,527,761.

(51) Int. Cl.
*B28B 1/00* (2006.01)
*C04B 35/48* (2006.01)
*C04B 35/505* (2006.01)

(52) U.S. Cl. ........................ 264/618; 501/103; 501/152

(58) Field of Classification Search .................. 264/618; 501/103, 152
See application file for complete search history.

(56) References Cited

U.S. PATENT DOCUMENTS

| | | | |
|---|---|---|---|
| 3,300,344 A | 1/1967 | Bray et al. | |
| 3,503,809 A | 3/1970 | Spacil | |
| 3,558,360 A | 1/1971 | Sverdrup et al | |
| 3,607,323 A | 9/1971 | Tedmon et al. | |
| 4,465,778 A | 8/1984 | Brook et al. | |
| 4,767,518 A | 8/1988 | Makalick | |
| 4,866,014 A | 9/1989 | Cassidy et al. | |
| 4,883,497 A | 11/1989 | Claar et al. | |
| 4,971,830 A | 11/1990 | Jensen | |
| 5,035,962 A | 7/1991 | Jensen | |
| 5,118,491 A | 6/1992 | Castellano et al. | |
| 5,217,822 A | 6/1993 | Yoshida et al. | |

(Continued)

OTHER PUBLICATIONS

PCT International Search Report and Written Opinion mailed Oct. 1, 2008, International Application No. PCT/US2008/050748, 15 pages.

(Continued)

*Primary Examiner*—Jason L Lazorcik
*Assistant Examiner*—Russell J Kemmerle, III
(74) *Attorney, Agent, or Firm*—Townsend and Townsend and Crew LLP

(57) ABSTRACT

A method of making a solid electrolyte-YSZ product, where the method includes the step of providing a powdered mixture of zirconia, yttria and about 2%, by wt., or less of a metal oxide, where yttria-stabilized zirconia is not added to the mixture. The method also includes sintering the powdered mixture at about 1500° C. or less, for about 5 hours or less, to form a reaction sintered YSZ. Also, a method of making a fuel cell electrolyte that includes the step of forming a green body that includes zirconia, yttria and about 2%, by wt., or less of a metal oxide, where yttria-stabilized zirconia is not added to the green body. The method also includes shaping the green body into a form of the electrolyte, and sintering the green body at about 1500° C. or less to form a reaction sintered yttria-stabilized zirconia and metal oxide electrolyte.

34 Claims, 10 Drawing Sheets

U.S. PATENT DOCUMENTS

| | | | |
|---|---|---|---|
| 5,227,258 | A | 7/1993 | Ito et al. |
| 5,261,944 | A | 11/1993 | Lockhart et al. |
| 5,368,667 | A | 11/1994 | Minh et al. |
| 5,474,800 | A | 12/1995 | Matsuzaki |
| 5,543,239 | A | 8/1996 | Virkar et al. |
| 5,589,017 | A | 12/1996 | Minh |
| 5,656,387 | A | 8/1997 | Barnett et al. |
| 5,788,788 | A | 8/1998 | Minh |
| 5,804,131 | A | 9/1998 | Majumdar et al. |
| 5,908,713 | A | 6/1999 | Ruka et al. |
| 5,993,511 | A | 11/1999 | Piro et al. |
| 6,099,985 | A | 8/2000 | Elangovan et al. |
| 6,248,468 | B1 | 6/2001 | Ruka et al. |
| 6,312,847 | B1 | 11/2001 | Tsukuda et al. |
| 6,344,426 | B1 | 2/2002 | Hata et al. |
| 6,379,417 | B2 | 4/2002 | Piro et al. |
| 6,432,570 | B1 | 8/2002 | Ippommatsu et al. |
| 6,589,680 | B1 | 7/2003 | Gorte et al. |
| 6,692,855 | B1 | 2/2004 | Aizawa et al. |
| 6,790,474 | B1 | 9/2004 | Hishinuma et al. |
| 7,045,231 | B2 | 5/2006 | Coors |
| 7,527,761 | B2 | 5/2009 | Swartzlander et al. |
| 2003/0219637 | A1 | 11/2003 | Coors |
| 2003/0224240 | A1 | 12/2003 | Yamashita et al. |
| 2006/0125157 | A1 | 6/2006 | Swartzlander et al. |

OTHER PUBLICATIONS

Anselmi-Tamburini, U. et al., "Electrical Properties Of Ni/YSZ Cermets Obtained Through Combustion Synthesis," Solid State Ionics, vol. 110, pp. 35-43, 1998.

Chen, S. et al., "Effect Of NiO Dissolution On The Transformation Of Plasma-Sprayed Y-PSZ," Materials Science and Engineering, vol. A114, pp. 159-165, 1989.

Chen, Shueiyuan et al., "Growth Kientics Of Sintered NiO/ZrO2 (5 mol.%Y2O3) Composites," Materials Science and Engineering, vol. A158, pp. 251-258, 1992.

Chen, Shueiyuan et al., "Polymorphic Transformation Of t' Phase In Yttria Partially Stabilized Zirconia," Materials Science and Engineering, vol. A123, pp. 145-152, 1990.

Chen, Shueiyuan et al., "Stability of Cubic ZrO2 (10 mol.% Y2O3) When Alloyed With NiO, Al2O3 Or TiO2: Implications To Solid Electrolytes And Cermets," Materials Science and Engineering, vol. B22, pp. 247-255, 1994.

Kuzjukevics, A. et al., "Plasma Produced Ultrafine YSZ-NiO Powders," Proceedings of the 17th Riso International Symposium on Materials Science, Roskilde, Denmark, pp. 319-324, 1996.

Linderoth, Soren et al., "NiO In Yttria-Doped Zirconia," Proceedings of the Fifth International Symposium on Solid Oxide Fuel Cells (SOFC-V), vol. 97-40, pp. 2 cover pages and 1076-1085, 1997.

Marinsek, Marjan et al., "Ni-YSZ Cermet Anodes Prepared by Citrate/Nitrate Combustion Synthesis", J. Power Sources 106 (2002), pp. 178-188.

Marinsek, Marjan et al., "Preparation of Ni-YSZ Composite Materials for Solid Oxide Fuel Cell Anodes by the Gel-Precipitation Method", J. Power Sources 86 (2000), pp. 383-389.

Primdahl, Soren et al., "Effect of Nickel Oxide/Yttria-Stabilized Zirconia Anode Precursor Sintering Temperature On The Properties Of Solid Oxide Fuel Cells," J. Am. Ceram. Soc., vol. 83, No. 3, pp. 489-494.

Ringuede, A. et al., "A Combustion Synthesis Method To Obtain Alternative Cermet Materials For SOFC Anodes," Solid State Ionics, vols. 141-142, pp. 549-557, 2001.

PREPARATION OF YTTRIA-STABILIZED ZIRCONIA REACTION SINTERED PRODUCTS

CROSS-REFERENCES TO RELATED APPLICATIONS

This application is a continuation-in-part of U.S. patent application Ser. No. 11/014,198, filed Dec. 15, 2004, and titled "PREPARATION OF YTTRIA-STABILIZED ZIRCONIA REACTION SINTERED PRODUCTS", the entire contents of which are herein incorporated by reference for all purposes.

BACKGROUND OF THE INVENTION

This invention relates to the preparation of materials that may be used in the electrodes and electrolytes of solid electrolyte fuel cells. In particular, the invention relates to methods of making zirconia-containing fuel cell electrodes and electrolytes that are not prepared from expensive pre-cursor yttria-stabilized-zirconia (YSZ) starting materials.

Solid electrolyte fuel cells include both oxygen-ion conducting solid-oxide fuel cells (SOFCs), and protonic ceramic fuel cells (PCFCs). Each fuel cell includes a pair of electrodes separated by a ceramic electrolyte that permits ions (e.g., oxygen ions, protons, etc.) to migrate between the electrodes as the cell generates electrical current. In solid electrolyte fuel cells, the layer of electrolyte material is often kept thin (e.g., about 25 µm or less) to allow efficient ion migration between the electrodes. Such a thin electrolyte layer made from ion-conducting ceramics is usually too fragile to support itself, and therefore requires an underlying support layer.

In some fuel cell designs, one of the electrodes acts as an electrolyte support in addition to being an electrode. For example, the fuel cell anode may be a self-supporting anode electrode on which the thin electrolyte layer is formed. Not surprisingly, electrodes that act as a support layers use significantly more starting material than non-supporting electrodes.

In the case of anode supported SOFCs, the cells operate at temperatures of about 700° C. to about 1000° C., requiring that the thermal coefficient of expansion (TCE) be closely matched between the electrolyte and the anode to prevent the thin electrolyte layer from fracturing as well as to maintain good adhesion between the layers. One way to match the TCEs is to make a substantial portion the electrolyte and anode out of the same material. A material that has been used successfully in both the electrolyte and self supporting anode of solid electrolyte fuel cells is yttria-stabilized zirconia (YSZ). In the electrolyte, YSZ acts as a good oxygen ion conductor at fuel cell operating temperatures, and in the electrodes YSZ provides a good substrate support for conductive materials that conduct the electrical current. For example, the anode may be made from a mixture of nickel oxide (NiO) homogenously dispersed in YSZ. When the nickel oxide is reduced to nickel metal the material becomes an electrically conductive ceramic-metal composite or "cermet." The finely dispersed YSZ in the anode also provides the three phase boundary (TPB) between the gas, electrode, and electrolyte.

Unfortunately, conventional methods for making YSZ for solid electrolyte fuel cells are complex and expensive. In one method, powders of monoclinic zirconia ($ZrO_2$) and 8-mol % yttria ($Y_2O_3$) are mixed and calcined at high temperature (e.g., about 1700° C.) to form tetragonal and cubic phased zirconia. As the reaction continues, fully yttria-stabilized cubic phased zirconia (i.e., YSZ) results. The reaction is slow, and the conversion of the zirconia into YSZ yttria requires the mixture be kept at high temperature for an extended period of time. As a result, the YSZ is formed as a large grained powder (e.g., grains greater than 1 µm in diameter), which may have to be extensively milled before it can be used in fuel cell electrolytes and electrodes. Other conventional methods of making YSZ, such as spray pyrolysis and co-precipitation, are even more complicated and costly.

The high cost of YSZ produced by conventional methods is an impediment to the widespread adoption of solid electrolyte fuel cells for residential and industrial power needs. This impediment is especially acute for fuel cells with a self-supporting electrode that can make up 90% or more of the total material used in the cell. Thus, the development of less complicated and costly methods of making YSZ for fuel cell electrodes and electrolytes would provide a significant advance in making fuel cells less expensive and more competitive for the generation of electric power.

BRIEF SUMMARY OF THE INVENTION

Embodiments of the invention include methods of making a reaction sintered yttria stabilized zirconia. The methods include the steps of providing a powdered mixture of zirconia, yttria and about 2%, by wt., or less of a metal oxide, without having to add yttria-stabilized zirconia; and sintering the powdered mixture in situ at about 1500° C. or less for about 5 hours or less, to form the reaction-sintered yttria stabilized zirconia comprising cubic YSZ.

Embodiments further include methods of making a fuel cell electrolyte. The methods include the step of forming a green body comprising zirconia, yttria and about 2%, by wt., or less of a metal oxide, where yttria-stabilized zirconia is not added to the green body. The methods also include sintering the green body at about 1500° C. or less to form a yttria reaction sintered zirconia (YRSZ) body comprising cubic yttria-stabilized zirconia.

Embodiments still further include methods of making a fuel cell electrode. The methods include the step of forming an unfired, or "green" body that includes zirconia, yttria and a metal oxide, where substantially no yttria-stabilized zirconia is added to the green body. The method also includes shaping the green body into a form of the electrode, and sintering the green body at about 1500° C. or less to form a sintered body that includes cubic yttria-stabilized zirconia and the metal oxide. In this embodiment, an excess of the metal oxide of about 65% by wt. is added to the formulation so that the yttria-stabilized zirconia and the metal oxide coexist in the sintered body. The method may also include reducing the sintered body to form the electrode.

Embodiments also further include methods of making a ceramic oxide fuel cell. The methods include the steps of forming a self-supporting electrode, forming an electrolyte on the self supporting electrode, and forming a second electrode on the electrolyte. The electrolyte may be made by combining zirconia, yttria and about 2%, by wt., or less of a metal oxide, where yttria-stabilized zirconia is not added, and sintering the mixture at about 1500° C. or less, for about 5 hours or less, to form a reaction sintered yttria-stabilized zirconia and the metal oxide. When the electrode is also made from reaction sintered yttria-stabilized zirconia and the metal oxide, the metal oxide is substantially dissolved in the electrolyte, but coexists with yttria-stabilized zirconia in the electrode at a concentration to make the electrode electronically conducting upon reduction of the metal oxide in the electrode to the conductive metal.

Embodiments also include additional methods of making solid electrolyte fuel cells. The methods include the steps of forming a self-supporting electrode from a YSZ cermet, forming an electrolyte on the self supporting electrode, and forming a second electrode on the electrolyte. The YSZ cermet may be made by combining zirconia, yttria, and a metal oxide into a powdered mixture, where yttria-stabilized zirconia is not needed. Then, the mixture may be sintered at about 1500° C. or less for about 5 hours or less to form a reacted two-phase body that includes cubic yttria-stabilized zirconia and the metal oxide. The two-phase body may be reduced to form the self-supporting electrode.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

In the present invention, it has been discovered that yttria-stabilized zirconia may be made by the reaction sintering of yttria powder and monoclinic zirconia in the presence of a metal oxide (e.g., nickel oxide) at low temperatures. These inexpensive starting materials may be converted in-situ into substantially pure-phased cubic YSZ plus metal oxide instead of having to use expensive YSZ as a starting material. When metal oxide is added to the mixture in concentrations below the solubility limit of about 2% by wt., a single phase, cubic YSZ results that is suitable as a fuel cell electrolyte. When the metal oxide is added in higher concentrations (e.g., about 65% by wt., or more) a two-phase composite is formed that includes the higher concentration metal oxide plus YSZ. This composite is suitable as a fuel cell electrode. The electrolyte and the electrode may be formed during the same co-firing and co-sintering reaction sintering process. This process results in yttria reaction sintered zirconia, YRSZ.

In contrast, conventional methods of making electrodes and electrolytes use pre-calcined cubic YSZ. For the electrodes, the pre-calcined YSZ is mixed with metal oxide powder prior to compaction and sintering at high temperature. The electrolytes are made with pure pre-calcined YSZ without the addition of metal oxide. The pre-calcined YSZ is predominantly in the cubic phase, or some combination of cubic and tetragonal phases, with the amount of monoclinic phase presumed to be negligible. Other conventional methods use combustion synthesis processes to make composites of nickel oxide (NiO) and YSZ from liquid precursors. These processes only make powders of Ni-YSZ for use in subsequent ceramic manufacturing. These methods do not recognize that a reaction sintering process can be done to convert in situ inexpensive monoclinic zirconia and yttria starting materials into a dense ceramic of cubic phase YSZ.

The amount of metal oxide needed for the reaction sintering may be as low as about 0.5%, by wt., or less of the starting materials. The low concentration of the metal oxides (e.g., nickel oxide) gives these M-YSZ (e.g., Ni-YSZ) ceramics low electrical conductivity, making them useful for ceramic electrolyte membranes for fuel cells (e.g., solid oxide fuel cells). The reaction sintering process also works with higher concentrations of metal oxide to make M-YSZ cermets that have good electrical conductivity when a portion of the metal oxide is reduced to a metal phase. These conductive M-YSZ cermets are useful for making electrode supports that provide an electrical conduction pathway and mechanical support to a supported electrode. Additional details on making M-YSZ materials according to the invention will now be described.

Exemplary Methods of Making M-YSZ Materials

Figure 1:
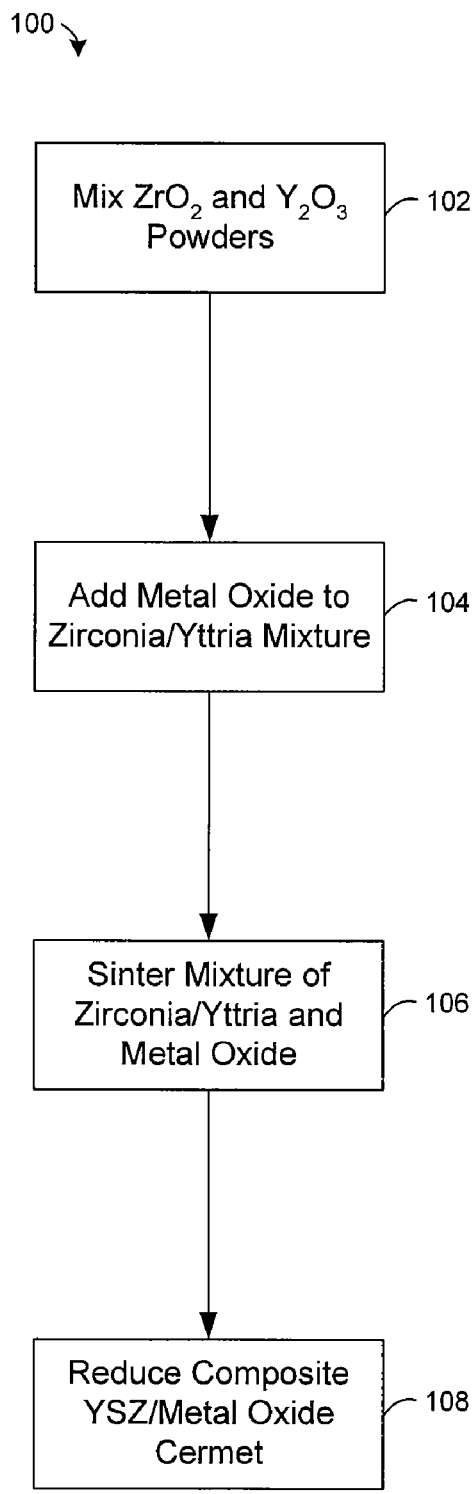
FIG. 1 is a flowchart diagramming some of the steps in an embodiment of the method of the invention for making the electrode.

FIG. 1 shows a flowchart describing steps from a method 100 of making reaction sintered zirconia YRSZ according to an embodiment of the invention. In step 102, yttria ($Y_2O_3$) and zirconia ($ZrO_2$) powders may be mixed together to form a yttria-zirconia mixture. The zirconia powder may be made predominantly from inexpensive monoclinic $ZrO_2$. The amount of yttria in the mixture (i.e., mol percent $Y_2O_3$) may be selected so the yttria stabilizes the zirconia in the suitable phase. For example, when about 1 to 3-mol % yttria is present in the heated mixture, the zirconia may be stabilized in tetragonal and/or cubic phases when the mixture is cooled back down to room temperature. With the addition of about 3-mol % to about 10-mol % yttria in the mixture, stabilized zirconia may be formed, called YSZ (e.g., 3YSZ to 10YSZ), which is mechanically stable and ionically conducting over a wide temperature range. Solid electrolyte fuel cells often use 8-mol % yttria-stabilized zirconia (i.e., 8YSZ) in fuel cell electrodes and electrolytes, due to the good mechanical properties and high ionic conductivity.

In step 104, a metal oxide is added to the mixture prepared in step 102 to facilitate the reactivity of the yttria and zirconia at a temperature of about 1500° C. or less. The metal oxide may be nickel oxide, iron oxide, cobalt oxide, manganese oxide, copper oxide, as well as combinations of these and other metal oxides. When the mixture is being prepared as a cermet electrode for a solid electrolyte fuel cell, nickel oxide may be chosen as the facilitator due to the high electronic conductivity, catalytic activity and stability of nickel metal under chemically reducing conditions. Other metal oxides may be selected for similar reasons.

The concentration (% wt.) of the metal oxide may be varied and depend on the how the M-YSZ material is used. If the M-YSZ will be used in an electrode or electrode support for a fuel cell, then the concentration of the metal oxide may be higher (e.g., about 50%, about 60%, about 65% wt., etc., or more of the metal oxide). Alternatively, if the M-YSZ will be used in the high ionic conductivity electrolyte of the fuel cell, the concentration of the metal oxide may be about 2%, 1%, 0.5%, etc. or less. In this case, the metal oxide dopant is added up to the limit of solubility in the YSZ phase. Further additions result in precipitation of the metal oxide phase at grain boundaries, which may reduce the ionic conductivity of the electrolyte. As noted above, metal oxide initiation of reaction sintering to convert separate monoclinic $ZrO_2$ and $Y_2O_3$ powders into YSZ may be done over a wide concentration range of the metal oxide.

In step 106, the mixture of yttria, zirconia and metal oxide may be heated to about 1500° C. or less in air, for about 5 hours or less. At these short times and low temperatures, a mixture of pure yttria and zirconia would not sufficiently react to form the equilibrium cubic YSZ, but in the presence of the metal oxide, there is enhanced reactivity allowing cubic YSZ to readily form. This in situ calcination process is called reaction sintering, where a solid state reaction and ceramic sintering occur simultaneously.

The metal oxide enhances the rate at which the equilibrium cubic phase of YSZ is produced. Without the metal oxide, the reaction between yttria and zirconia is too slow at 1500° C. to be practical. In step 108, the reaction sintered product may be exposed to a reducing environment to reduce at least a portion of the metal oxide to produce the base metal. If the metal oxide is nickel oxide, at least some of the metal oxide may be reduced to the pure metal (nickel metal) in the reducing step 108. A hydrogen-containing atmosphere is usually used to reduce the anode. This can be done inside the fuel cell, or as a separate step (a typical separate reducing profile is 800° C. for 24 hours). Reducing at least a portion of the metal oxide to the conductive metal coverts the sintered product into an electrically conductive cermet suitable for solid electrolyte fuel cell electrodes (e.g., fuel cell anodes).

Figure 2A:
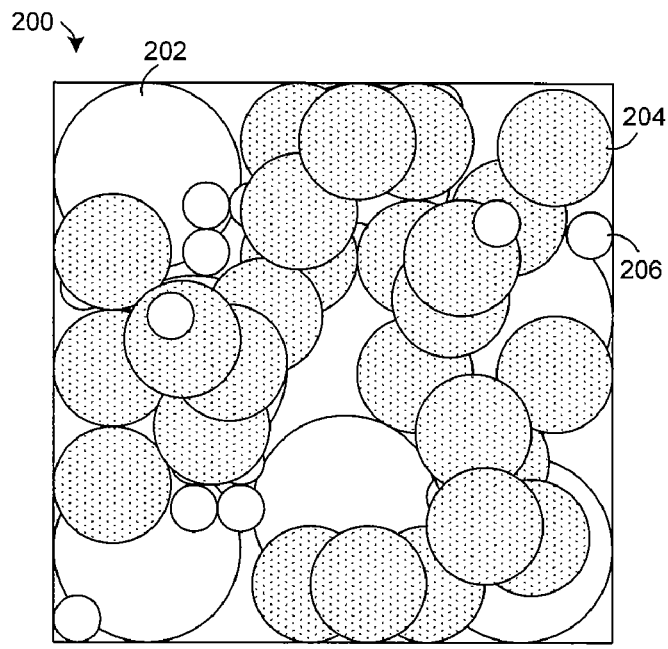
FIGS. 2A-B show cross-sectional distributions of particles before and after a reduction of the nickel oxide to nickel metal in the electrode.
Figure 2B:
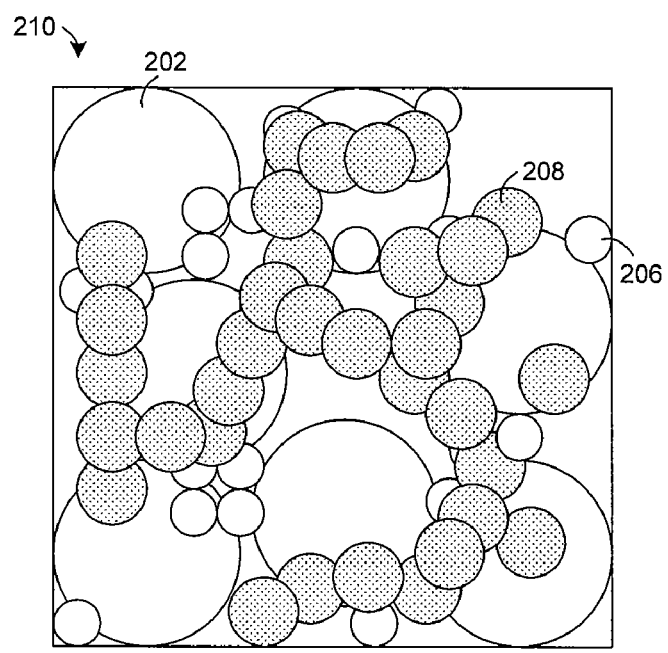

FIGS. 2A and 2B show a cross-section of a sintered mixture of yttria, zirconia and nickel oxide before and after a reduction step like step 108 described above. FIG. 2A shows a cross-sectional matrix of a pre-reduced mixture 200, which includes particles of coarse YSZ 202 and fine YSZ 206 in contact with particles of nickel oxide 204. FIG. 2B shows a cross-sectional matrix of a reduced mixture 210 that shows the particles of nickel oxide 204 having been reduced to particles of nickel metal 208.

YSZ cermets like the one shown in FIG. 2B have good fuel cell electrode characteristics, including high porosity (e.g., about 20% to about 40%), good mechanical strength, good catalytic activity, and good electronic conductivity as a result of the interconnected metallic grains. These characteristics can also make the cermets useful as materials for gaseous diffusion membranes and gas sensors.

Exemplary Solid Electrolyte Fuel Cell

Figure 3:
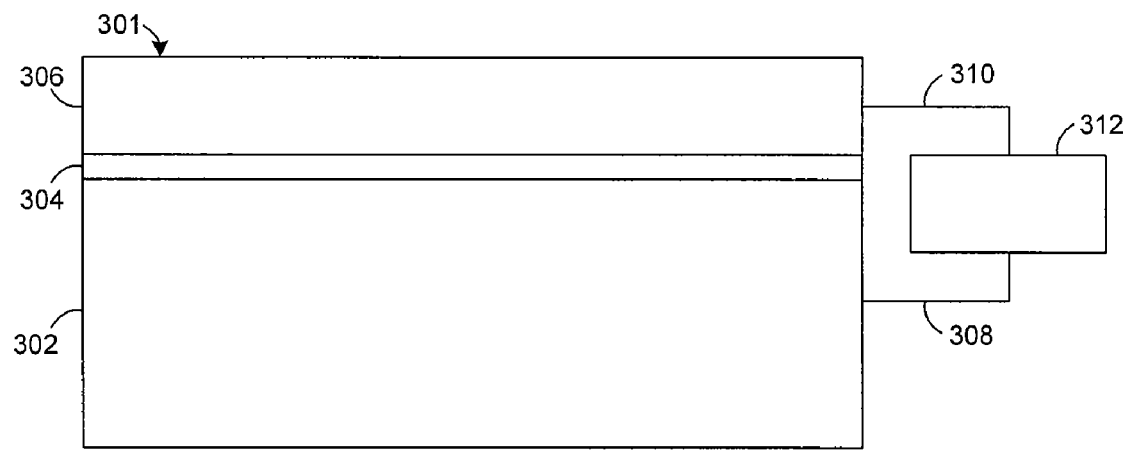
FIG. 3 shows a cross-section of a solid electrolyte fuel cell having a cermet support electrode.

FIG. 3 shows a simplified schematic of a solid electrolyte fuel cell 301 that includes materials made according to the present invention. The fuel cell includes a solid electrolyte 304 contacting both cathode electrode 306 and anode electrode 302. The fuel cell may be a SOFC, where the electrode material may be a solid oxide ceramic that conducts oxygen ions ($O^{2-}$), or a PCFC, where the electrode may be made from a proton conducting ceramic that conducts protons ($H^+$). Ion conducting materials, including mixed ionic conductors, used in electrolyte 304 may include yttria-stabilized zirconia (e.g., 8YSZ), scandia doped zirconia (e.g., SDZ), doped ceria, and perovskite ceramic proton conductors (e.g., yttrium-doped barium cerate), among other materials.

The anode electrode 302 may be a self-supporting electrode, formed from a YSZ cermet made according to methods of the invention. In some embodiments, a mixture of yttria, zirconia and metal oxide may be formed into a green body that has the shape of the electrode 302. The green body may then be reaction sintered at about 1500° C. or less to form a sintered body made primarily of YSZ and the metal oxide. The sintered body may be exposed to a reducing environment to reduce the body to the electrode 302. For example, if the metal oxide is nickel oxide, the reducing environment converts at least a portion of the NiO to nickel metal, making the electrode 302 more electrically conductive. In other embodiments, the yttria, zirconia and metal oxide may be converted into an unreduced composite before being shaped into electrode 302.

The electrolyte 304 materials may be formed on the anode electrode 302 by any conventional means such as spraying, dip-coating, painting etc. The electrolyte 304 may be applied to the anode electrode prior to reaction sintering, in which case the electrolyte and electrode are co-sintered. That is, the electrode simultaneously undergoes reaction sintering while the electrolyte undergoes ordinary sintering. The electrolyte may also be applied to the electrode subsequent to reaction sintering of the electrode in a process that may include additional sintering operations.

In additional embodiments, the electrolyte 304 materials may be formed from yttria, zirconia and metal oxide like the electrode 302. For example, the electrolyte 304 may be formed from the same mixtures of zirconia and yttria powders as the Ni-YSZ electrode 302, but with a lower concentration (e.g., about 1% wt. or less) of the nickel oxide. The lower NiO concentration makes the electrolyte 304 much less electrically conductive than the electrode 302, which creates the electrically insulating gap between the electrodes 302 and 306.

Using the metal oxide YSZ material for the electrolyte 304 may be beneficial in fabrication processes where the electrode 302, an electrode support, and the electrolyte 304 are co-sintered. Using similar materials for the co-sintered components means they will have similar sintering temperatures, which makes it less challenging to match the degree of shrinkage between the components during firing. For example, stress and fracturing can occur when an anode support made from powders of nickel oxide, zirconia and yttria is co-sintered with an electrolyte made from 8YSZ powder due to the large difference in sintering temperatures between the two materials.

The electrolyte 304 may be formed with a thickness of about 25 μm or less to facilitate the fast migration of ions between the electrodes 302 and 306. The cathode electrode 306 may also be made from a conductive ceramic or other conventional SOFC or PCFC cathode electrode materials. The electrodes 302 and 306 may be connected via electrically conductive conduits 308 and 310 to supply electrical energy to load 312 to produce useful work. The anode support of the assembled solid electrolyte fuel cell (e.g., the assembled cathode, electrolyte, and anode) may be reduced in the fuel cell itself in, for example, a hydrogen containing atmosphere, or separately in a hydrogen-containing atmosphere. A typical profile used to reduce the cermets would be a 4% hydrogen atmosphere, with the balance being argon, at temperature of 800° C., for about 24 hours.

EXAMPLES

Figure 4:
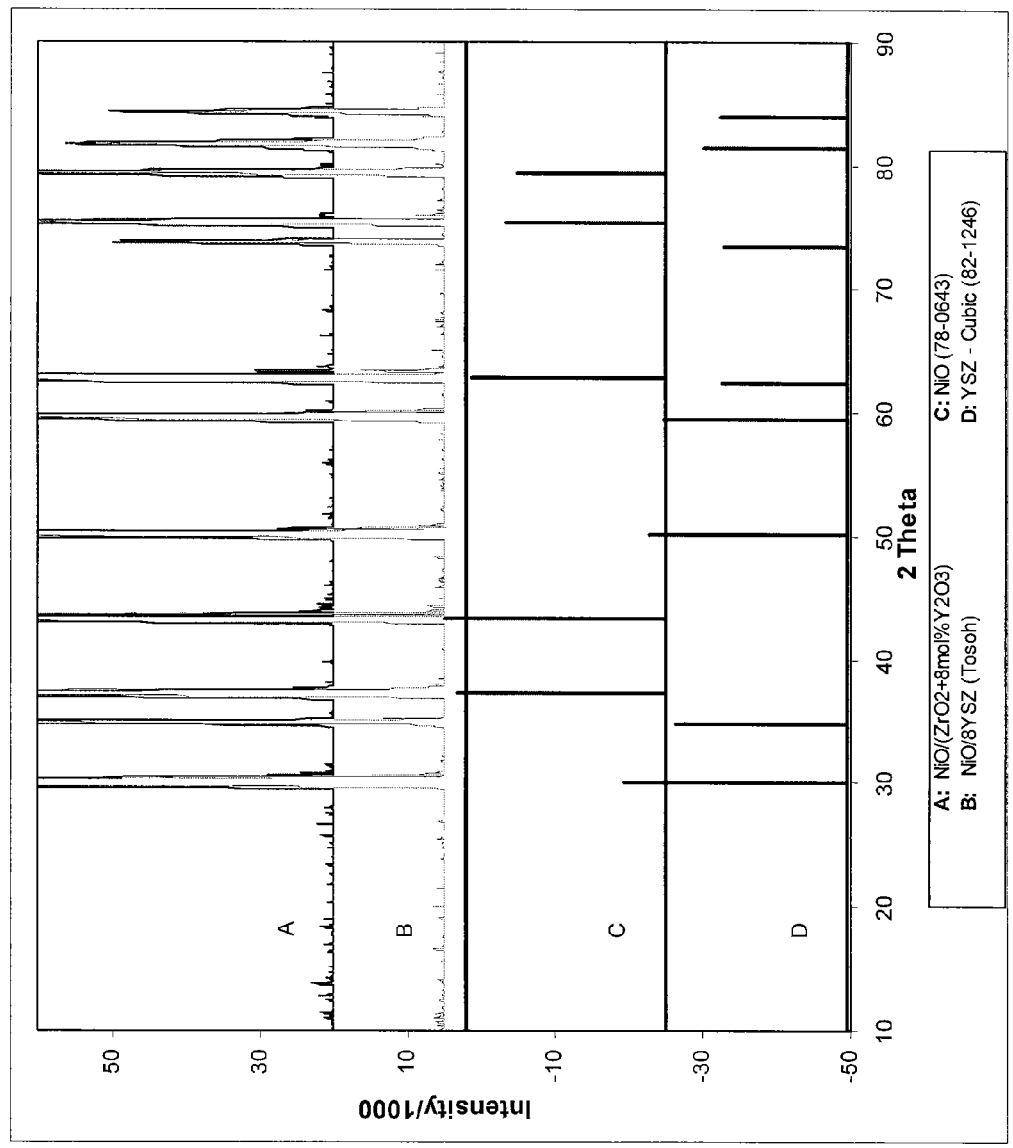
FIG. 4 is an X-ray diffraction pattern of a sintered zirconia-yttria and nickel oxide mixture compared with commercially made 8YSZ.

Experiments were conducted to examine the effect of nickel oxide (NiO) on the sintering of powdered zirconia ($ZrO_2$) and yttria ($Y_2O_3$). A mixture of zirconia and 8-mol % yttria were mixed with nickel oxide and heated at about 1500° C. in air for less than 5 hours. Typically, the NiO comprises about half (by weight) of the composite, with the balance consisting of $ZrO_2$ and $Y_2O_3$. The NiO enhances the rate at which zirconia and yttria react, allowing a two phase composite of YSZ and NiO to be formed at about 1500° C. FIG. 4 shows an X-ray diffraction pattern of the sintered product, which reveals a strong correlation of the peaks with commercially made 8-mol % yttria stabilized zirconia from Tosoh. The XRD pattern also lacks peaks attributable to the yttria or monoclinic zirconia starting materials. This indicates that virtually all of the powdered zirconia and yttria were converted to cubic 8YSZ during sintering in the presence of NiO.

Figure 5:
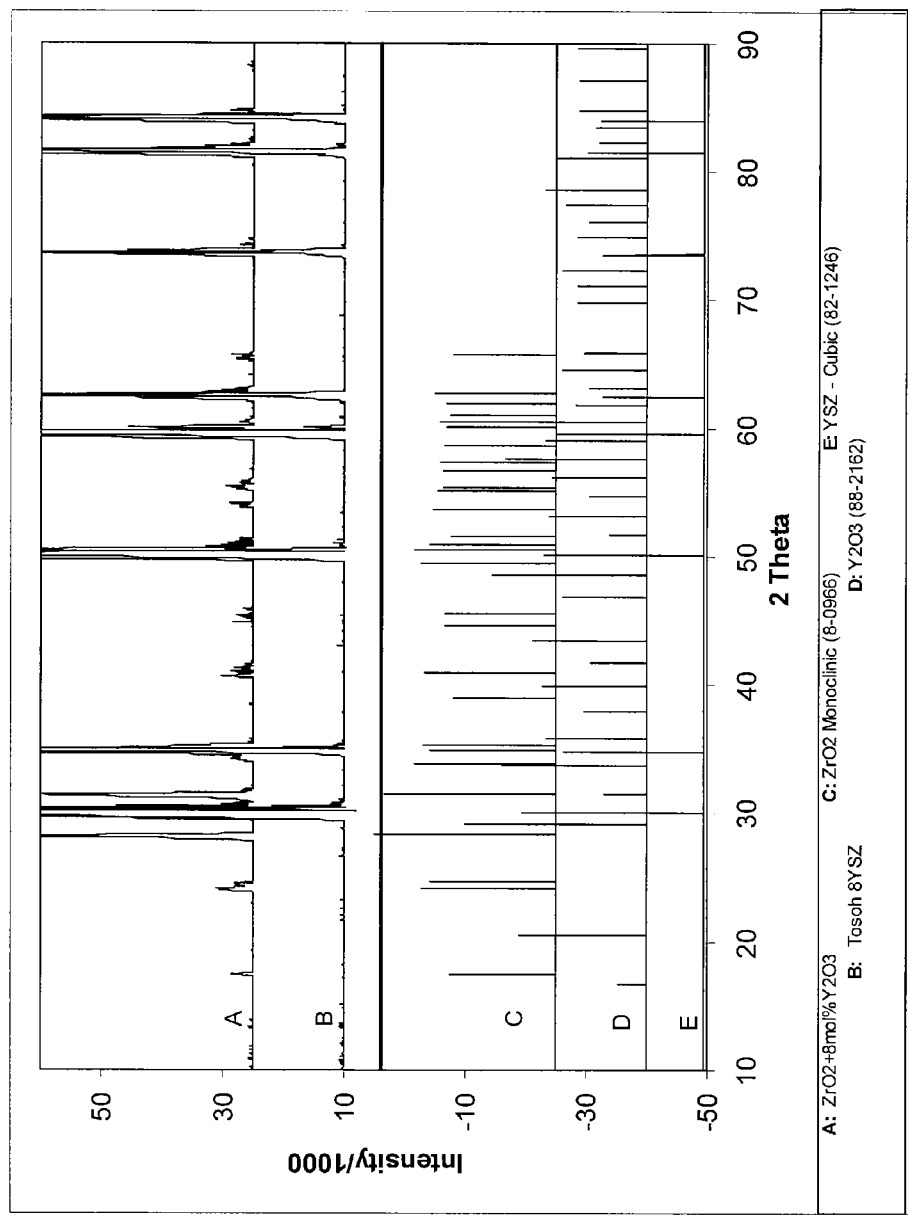
FIG. 5. is an X-ray diffraction pattern of a calcined zirconia-yttria mixture compared with commercially made 8YSZ.

A comparative experiment was also conducted where powders of zirconia and 8-mol % yttria were mixed and fired without nickel oxide. Heating the powdered mixture at about 1500° C. for less than 5 hours, without the NiO, resulted in a poly-phase material with some cubic 8YSZ, as well as unreacted monoclinic zirconia, unreacted yttria, and other yttria/zirconia compounds. FIG. 5 shows an X-ray diffraction pattern of the calcined product, which has peaks correlating to a combination cubic 8YSZ, as well as the other phases mentioned. Thus, calcining yttria and zirconia for only a few hours at this temperature does not allow for the conversion to pure cubic YSZ. The nickel oxide enhanced the solid-state reaction between yttria and zirconia, readily producing cubic YSZ (i.e., reaction sintering).

NiO-Doped YRSZ Density and XRD Measurements

Additional experiments were conducted to demonstrate that even at low concentrations NiO can facilitate the transformation of monoclinic $ZrO_2$ and $Y_2O_3$ powders into reaction sintered NiO-doped yttria stabilized zirconia (NiYRSZ). Two batches of specimens were prepared; one group with Tosoh 8YS fully stabilized zirconia doped with 0, 2, 4, 8 and 10 wt % NiO, and a second group made with YRSZ (a mixture of 92 mol % $ZrO_2$ and 8% $Y_2O_3$) doped with 0, 0.5, 1, and 2 wt % NiO. The average particle size of the $ZrO_2$ powder was 0.4 μm (10.2 $m^2$/g) compared to 0.5 μm (6 $m^2$/g) for the Tosoh 8YS powder. The NiO powder used was much coarser (10-20 μm). The powders were thoroughly mixed and uniaxially compacted into discs in a 0.75" diameter die at 22.6 kpsi. The specimens were fired on reticulated zirconia foam for 4 hours at 1500° C. At least two specimens of each composition were prepared. The fired discs were measured for bulk density and lapped on both faces to a finished thickness of 4.0±0.1 mm. One specimen of each composition was coated on both faces with platinum paste (ESL 5542) and fired at 980° C. for 30 minutes. These specimens were used for conductivity measurements, and the uncoated specimens were used for XRD and SEM analysis.

Figure 6:
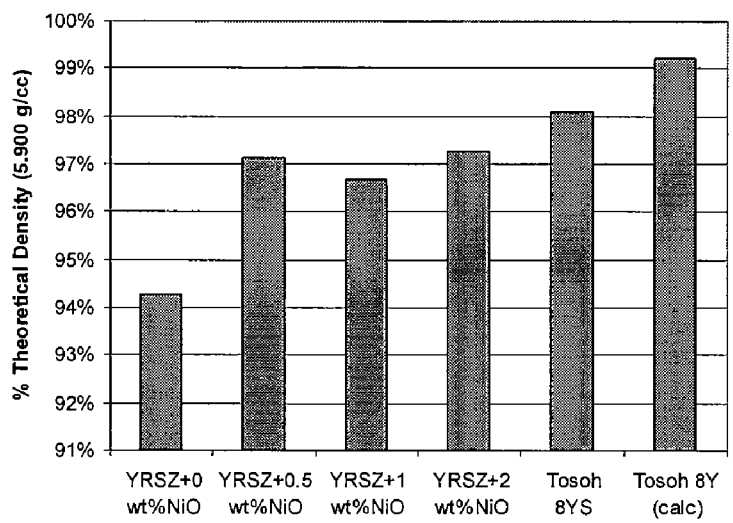
FIG. 6 is a bar graph showing fired bulk densities of NiO-doped YSZ compounds as a percentage of the theoretical density of pure cubic phase YSZ.

The sintered densities of the NiO-doped YRSZ specimens are shown in FIG. 6. The theoretical density of cubic 10YSZ is 5.90 g/cc and tetragonal 6YSZ is 5.94 g/cc, based on the crystallographic measurements of Yashima in JCPDS 82-1246 and 82-1242, respectively. The densities for both Tosoh 8YS and calcined 8Y are included for reference. It may be observed that the NiO-doped YRSZ specimens all achieved reasonable fired densities while the undoped YRSZ specimen remained porous. This is indicative that the NiO served as a sintering aid.

Figure 7:
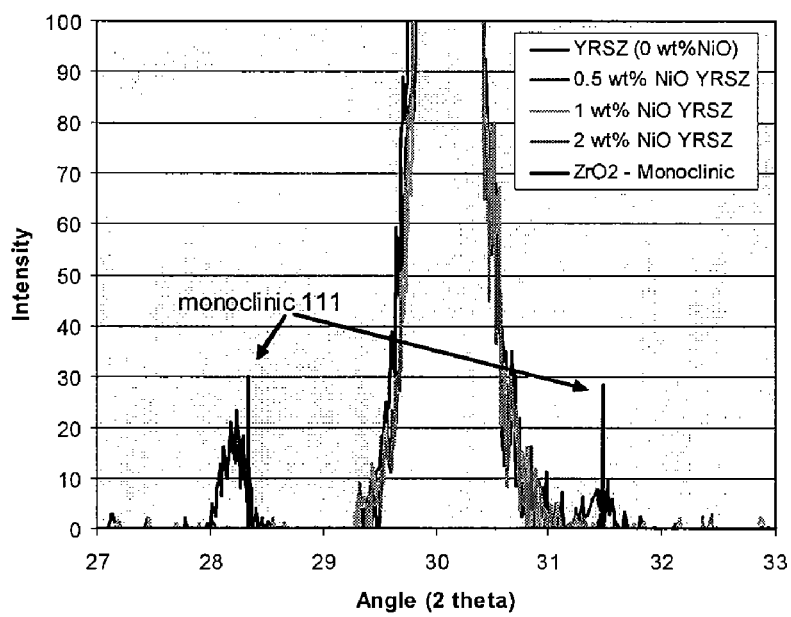
FIG. 7 is an X-ray diffraction (XRD) plot for YRSZ doped with up to 2 wt. % NiO, centered on the cubic (111) (tetragonal (101)) showing the monoclinic (111) splitting in the YRSZ without NiO.

X-ray diffraction experiments were conducted to learn more about the phase of the zirconia in the sintered samples. XRD was obtained on the specimens using a Scintag Pad-X diffractometer, $k\alpha_1$ (1.54056 Å) from 20 to 90 degrees with a step size of 0.02 degrees and scan rate of 0.5 seconds. The XRD patterns for the specimens are shown in FIG. 7 for angles between 27 and 33 degrees (2θ) and the lower 2% of the intensity range. This shows the tell-tale indication of the presence of any monoclinic phase. The undoped YRSZ clearly shows the two strongest monoclinic (111) peaks, but all of the NiO-doped specimens show no trace of monoclinic phase.

Figure 8:
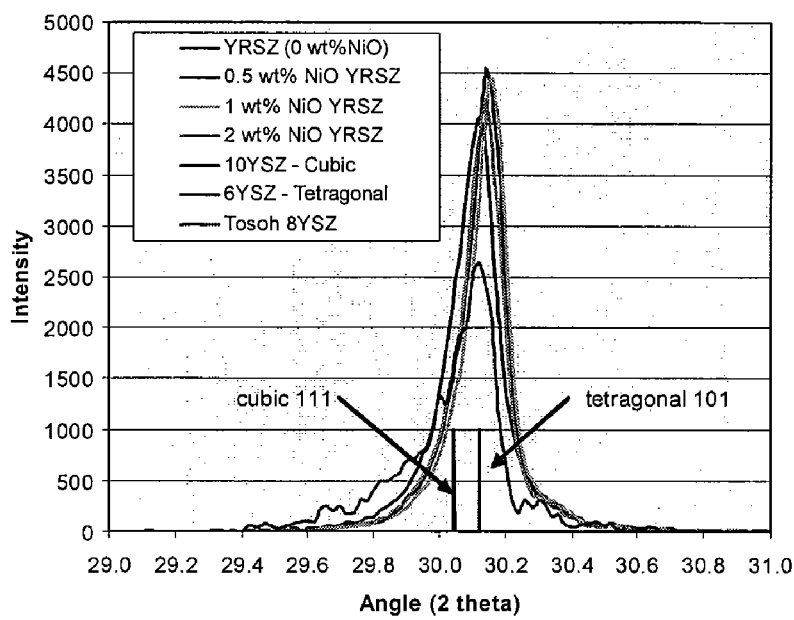
FIG. 8 is an XRD plot of principle cubic/tetragonal peaks in NiO-doped YRSZ and Tosoh 8YS.

FIG. 8 shows the XRD patterns between 29 and 31 degrees (2θ). The 10YSZ cubic (111) and 6YSZ tetragonal (101) are also included for reference. Also, the undoped Tosoh 8YS pattern is shown. All of the peaks line up well with the 8YSZ peak, which appears to correspond to the 6YSZ tetragonal peak. However, there is only 0.075° of separation between these two reference peaks. It is reasonable to expect the 8YSZ (111) to occur somewhere in the middle, but any definitive conclusion as to which phase is represented is really beyond the resolution of the x-ray diffractometer. In any event, if the Tosoh 8YS may be assumed to be cubic; it is safe to assume that the phase of all of the doped YRSZ specimens is also cubic. Furthermore, all of the peaks are quite sharp. If mixed cubic/tetragonal phases co-existed, the peaks would be expected to be substantially broadened, since the principle cubic and tetragonal peaks do not exactly line up.

Figure 9:
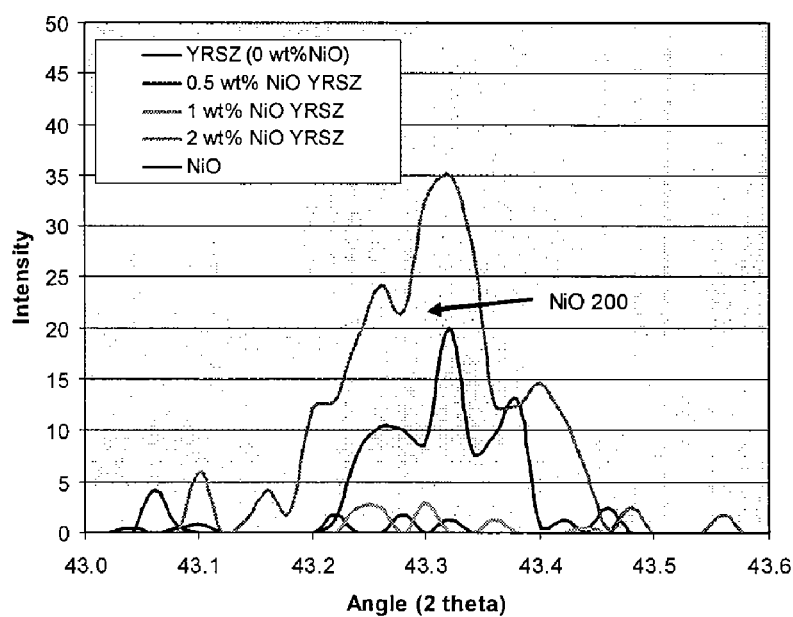
FIG. 9 is an XRD plot that shows trace amounts of undissolved nickel oxide in YRSZ.
Figure 10:
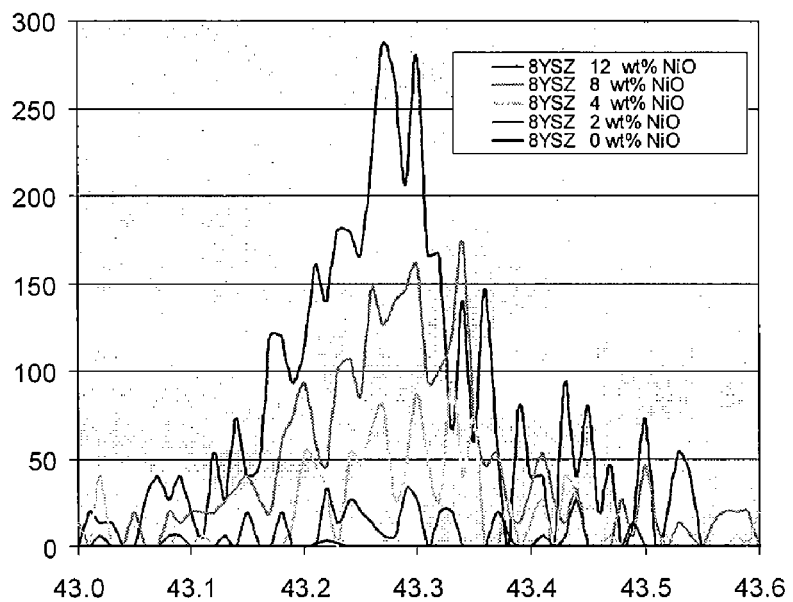
FIG. 10 shows XRD plots of NiO-doped Tosoh 8YS that indicate undissolved nickel oxide at multiple NiO concentrations.

Finally, the XRD patterns are shown between 43 and 43.6 degrees (2θ), centered on the principle (200) NiO peak at 43.297°, for the NiO-doped YRSZ specimens in FIG. 9 and for the NiO-doped Tosoh 8YS specimens in FIG. 10. In FIG. 9, a trace amount of NiO is observable, particularly in the 2% specimen. It is not clear why the NiO is present in the 0.5% specimen the 1% specimen had essentially none. According to the published literature, the solubility of NiO in YSZ is between 1-2 wt % when sintered in air. In FIG. 10, NiO is clearly present for concentrations greater than 4 wt. %, but not at 2%, consistent with the results for the YRSZ.

Ionic Conductivity Measurements

Additional experiments were conducted to compare the ionic conductivity (e.g., oxygen ion conductivity) of Ni-YSZ samples made according to embodiments of the invention with commercial samples of YSZ made with conventional methods. Conductivity measurements were made with the platinum coated specimens in air using an Agilent 4338B milliohmeter in four wire mode. The specimens were placed in a tube furnace next to a type-k thermocouple and attached to the instrument by 0.025" platinum probe wires. Total bulk resistance was measured with decreasing temperature, controlled by PID, from 1000 to 400° C. at 3.25° C./min. Specimen resistance, temperature, and time were logged by computer using a LabView data acquisition program. The calibration error due to temperature-dependent fixture resistance was less than 25 mΩ, or no more than about 2% of the total measured specimen resistance at the highest temperature.

Figure 11:
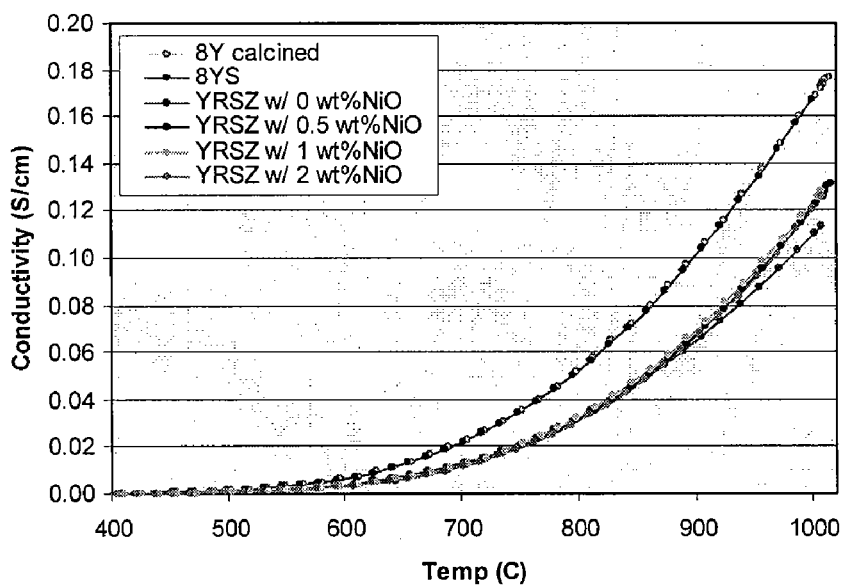
FIG. 11 shows a plot of total bulk ionic conductivities for NiO-doped YRSZ versus temperature for multiple NiO concentrations.

The total bulk conductivities for NiO-doped YRSZ are plotted in FIG. 11. Also plotted are the undoped Tosoh 8YS and calcined 8Y materials. It is clearly seen that even small additions of NiO reduce the conductivity significantly. For example, at 800° C. the conductivity of undoped 8YSZ is about 50 mS/cm, while for the doped YRSZ the conductivity was about 30 mS/cm—or a decrease of 40%. The conductivity of undoped YRSZ was lower, due to porosity and the residual monoclinic phase. Apparently, there was practically no difference in conductivity with NiO concentration up to 2 wt % NiO-doped YRSZ.

Figure 12:
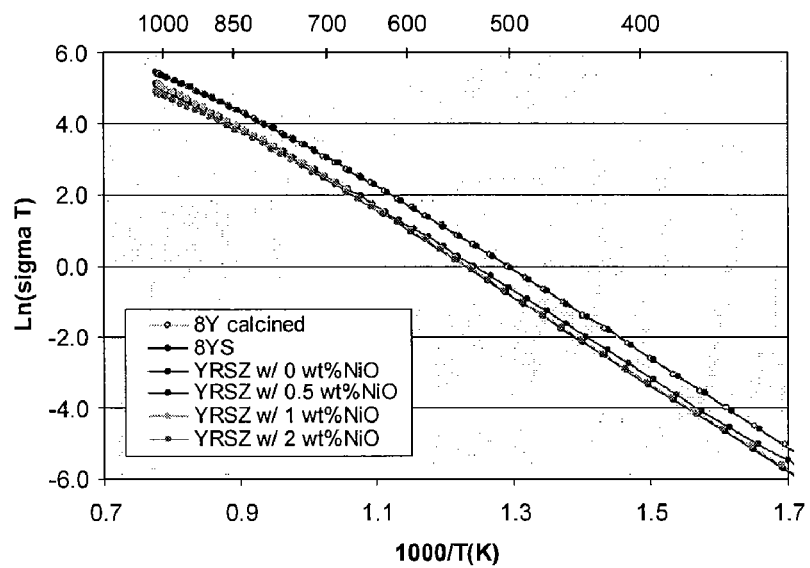
FIG. 12 shows an ionic conductivity Arrhenius plot for NiO-doped YRSZ.

Arrhenius plots of the conductivities presented in FIG. 11 are shown in FIG. 12. Although the plots for the doped YRSZ specimens are shifted downwards, the slopes are identical within experimental error. The activation energy between 300 and 700° C. for all specimens was 1.050±0.003 eV except for the undoped YRSZ, which was 1.03 eV. This means that the same bulk oxygen ion conductivity mechanism in cubic 8YSZ also predominates in NiO-doped YRSZ.

Figure 13:
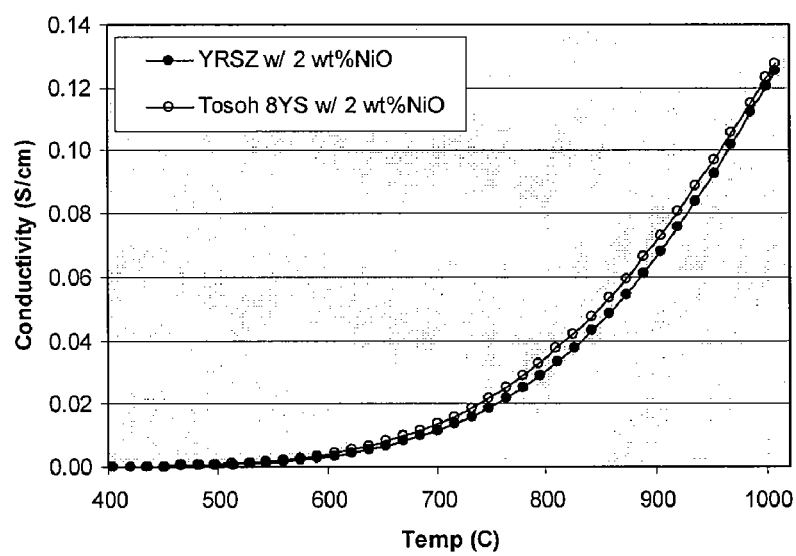
FIG. 13 shows an ionic conductivity versus temperature plot for Tosoh 8YS and YRSZ with 2% wt., NiO.

Conductivity versus temperature for Tosoh 8YS and YRSZ, each with 2 wt % NiO, is plotted in FIG. 13. It may be observed that there is practically no difference in the conductivity between the two specimens. In other words, for the same NiO dopant concentration, the ionic conductivity of the cubic YSZ phase does not depend on whether it was reaction sintered in-situ or pre-calcined.

Experiments in a Hydrogen Containing Atmosphere

Although NiO tends to stabilize YSZ in the cubic phase, it has been observed that some of the ceramic may transform over time into the tetragonal phase at elevated temperatures in reducing atmosphere. This may effect the long-term performance and durability of SOFCs. To test the extent of this transformation for the NiYRSZ made according to embodiments of the invention, samples of the materials were exposed to an hydrogen gas containing atmosphere at elevated temperatures to observe the effect of this exposure on the materials composition and ionic conductivity.

Figure 14:
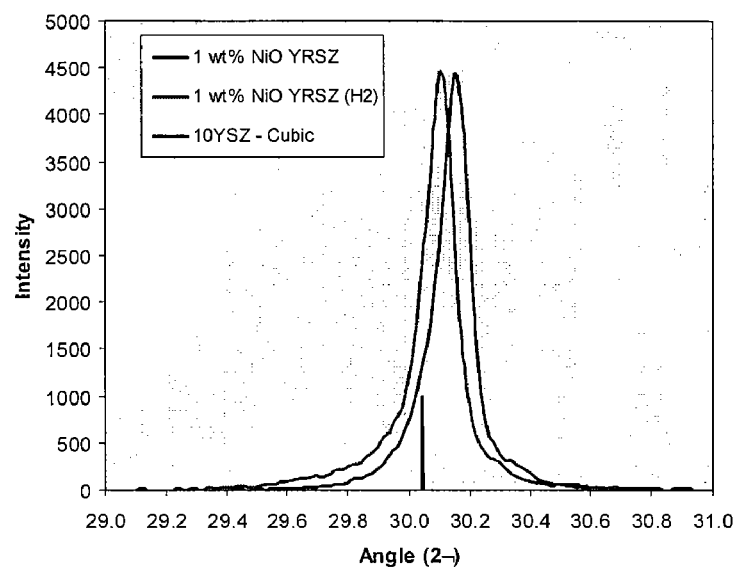
FIG. 14 shows comparative XRD plots for 1 wt. % NiO-doped YRSZ before and after aging the material at 850° C. for 200 hours in 4% $H_2$/Ar.

The 1 wt % NiO-doped YRSZ specimen was tested in 4% $H_2$/Ar at 850° C. for 200 hours to observe the degradation in conductivity. The specimen was originally a light rose color, but at the completion of this test, the specimen was completely black. This is consistent with the observation of other researchers. Apparently, NiO is less soluble in the zirconia lattice in reducing atmosphere, and metallic Ni particulates are precipitated out. FIG. 14 shows the comparative XRD patterns for the 1% NiO-doped specimen before and after aging in hydrogen. As in FIG. 8, the angles between 29° and 31° where the principle cubic (111) and tetragonal (101) peaks occur. It is noteworthy that the aged peak is sharp, and shows no sign of broadening with conversion to the tetragonal phase due to aging. Furthermore, the aged peak is shifted to the left—away from the tetragonal peak—rather than to the right. This data supports the belief that, even though some Ni is exsolved from the lattice, the YSZ phase remains cubic, and any changes in conductivity are due to the Ni phase at grain boundaries, and not due to changes in the bulk conductivity of the YSZ.

Figure 15:
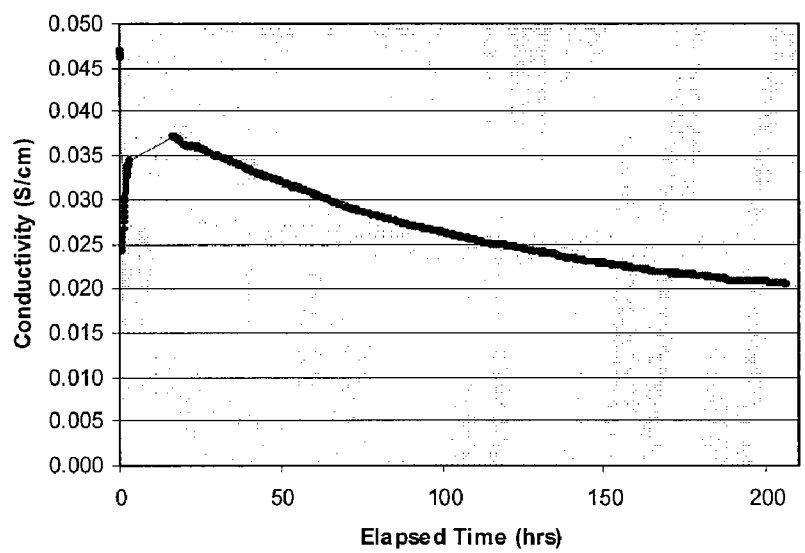
FIG. 15 shows a plot of ionic conductivity versus time for the exposure of 1 wt % Ni-doped YRSZ material to a hydrogen atmosphere.

The aged conductivity plot for the specimen is shown in FIG. 15. The specimen was initially reheated in air to 850° C. for one hour, and then aged in 4% $H_2$/Ar for the remainder of the run. It may be observed that the initial conductivity was 47 mS/cm in air, and after an equilibration interval of about 1°-20 hours, monotonically decreased to about 20 mS/cm. This constitutes a very large drop in conductivity, with serious implications on SOFC performance over time. However, the electrolyte membrane is exposed to air on the cathode side, and the oxygen pressure at the three phase boundary on the anode side of a working cell is probably never as low as what was used in this experiment. In any event, 8YSZ electrolyte, whether traditional or reaction sintered, will probably experience some of NiO dissolution during sintering, and conductivity degradation due to exsolution during operation.

The above experiments indicate that in low concentrations NiO can still catalyze the reaction sintering of monoclinic ZrO2 and Y2O3 to form cubic YSZ. They also provide evidence that NiO simultaneously stabilizes the cubic phase over a wide range of operating conditions. In addition, the data indicate that NiO is a potent sintering aid, and that NiO in small concentrations inhibits the cubic to tetragonal 8YSZ transition.

The experimental results also indicate that the total bulk conductivity of NiO-doped YRSZ is about the same as that of NiO-doped YSZ at the same concentration level. The data also indicate that dissolved NiO in YSZ up to the solubility limit of about 2 wt % lowers the total bulk conductivity by as much as 40% in air, and much as 75% in hydrogen, and does not change the dominant oxygen ion transport mechanism or introduce any parasitic electronic charge carriers. These results all indicate that it is feasible to fabricate thin and dense NiO-doped YRSZ electrolyte membranes on porous NiYRSZ anode supports that enhance co-sintering and dramatically lower manufacturing costs.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A method of making a reaction sintered yttria stabilized zirconia, the method comprising:
providing separate powders of zirconia, yttria, and a metal oxide and mixing them into a powdered mixture of zirconia, yttria and about 2%, by wt., or less of a metal oxide, wherein yttria-stabilized zirconia is not added to the mixture;

sintering the powdered mixture at about 1500° C. or less, for about 5 hours or less, to form the reaction-sintered yttria stabilized zirconia comprising cubic YSZ.

2. The method of claim 1, wherein the presintered zirconia comprises monoclinic $ZrO_2$.

3. The method of claim 2, wherein presintered zirconia comprises more of the monoclinic $ZrO_2$ than cubic $ZrO_2$.

4. The method of claim 2, wherein substantially all the monoclinic $ZrO_2$ is converted into cubic $ZrO_2$ during the sintering.

5. The method of claim 1, wherein the presintered zirconia and yttria are not calcined prior to the sintering.

6. The method of claim 1, wherein the metal oxide is dissolved in the cubic YSZ to make the reaction-sintered yttria stabilized zirconia a single phase material.

7. The method of claim 1, wherein the metal oxide is selected from the group consisting of nickel oxide, iron oxide, cobalt oxide, manganese oxide, copper oxide, and mixtures thereof.

8. The method of claim 1, wherein the metal oxide is nickel oxide.

9. The method of claim 1, wherein the metal oxide is about 1%, by wt., or less of the powdered mixture.

10. The method of claim 1, wherein the metal oxide is about 0.5%, by wt., or less of the powdered mixture.

11. The method of claim 1, wherein the powdered mixture comprises about 3-mol % to about 10-mol % yttria.

12. The method of claim 11, wherein the powdered mixture comprises about 8-mol % yttria.

13. The method of claim 1, wherein the reaction sintered yttria-stabilized zirconia forms an electrolyte of a solid oxide fuel cell.

14. The method of claim 13, wherein the electrolyte is co-sintered with an electrode of the solid oxide fuel cell.

15. The method of claim 14, wherein the electrode comprises a second reaction sintered yttria stabilized zirconia.

16. The method of claim 15, wherein the second reaction sintered yttria-stabilized zirconia is formed from a powdered mixture of zirconia, yttria and greater than 2%, by wt., of a metal oxide.

17. The method of claim 16, wherein the metal oxide is nickel oxide.

18. A method of making a fuel cell electrolyte, the method comprising:

forming a green body comprising separate powders of zirconia, yttria and about 2%, by wt., or less of a metal oxide that are mixed into a powdered mixture, wherein yttria-stabilized zirconia is not added to the green body; and sintering the green body at about 1500° C. or less to form a reaction sintered body comprising cubic yttria-stabilized zirconia.

19. The method of claim 18, wherein the green body is formed on an electrode of the fuel cell.

20. The method of claim 19, wherein the electrode is an anode.

21. The method of claim 19, wherein the electrode forms a second green body comprising zirconia, yttria and greater than 2%, by wt., of the metal oxide.

22. The method of claim 21, wherein the metal oxide in the second green body is about 50%, by wt., or more.

23. The method of claim 21, wherein the electrolyte and the electrode are co-sintered.

24. The method of claim 23, wherein the co-sintering forms a single phase cubic YSZ in the electrolyte and a two-phase composite of metal oxide and cubic YSZ in the electrode.

25. The method of claim 24, wherein the electrolyte and the electrode are exposed to a reducing atmosphere to convert at least a portion of the metal oxide into metal.

26. The method of claim 25, wherein the reducing atmosphere reduces the metal oxide component in the electrode to a conductive metal.

27. The method of claim 25, wherein the reducing atmosphere comprises hydrogen.

28. The method of claim 18, wherein the metal oxide is nickel oxide.

29. The method of claim 18, wherein the green body is sintered for about 5 hours or less.

30. A method of making a ceramic oxide fuel cell, the method comprising:

forming a self-supporting electrode;

forming an electrolyte on the self supporting electrode; and forming a second electrode on the electrolyte, wherein the electrolyte is made by:

combining separate powders of zirconia, yttria and about 2%, by wt., or less of a metal oxide, and mixing them into a powdered mixture, wherein yttria-stabilized zirconia is not added to the mixture; and sintering the mixture at about 1500° C. or less, for about 5 hours or less, to form a reaction sintered yttria-stabilized zirconia and the metal oxide.

31. The method of claim 30, wherein the ceramic oxide fuel cell is a solid oxide fuel cell.

32. The method of claim 30, wherein the solid electrolyte fuel cell is a protonic ceramic fuel cell.

33. The method of claim 30, wherein the metal oxide comprises nickel oxide.

34. The method of claim 30, wherein the self supporting electrode is formed by:

combining zirconia, yttria and greater than about 50%, by wt., of the metal oxide;

co-sintering the self supporting electrode with the electrolyte, wherein the co-sintering forms a single phase cubic YSZ in the electrolyte and a two-phase composite of metal oxide and cubic YSZ in the electrode; and reducing at least a portion of the metal oxide in the sintered electrode to conductive metal.

* * * * *